June 21, 1966 R. M. SEE 3,257,623

SINGLE SWEEP AUDIO OSCILLATOR

Filed May 7, 1964 2 Sheets-Sheet 1

INVENTOR.
ROBERT M. SEE
BY William J. Miller
ATTORNEY

June 21, 1966 R. M. SEE 3,257,623

SINGLE SWEEP AUDIO OSCILLATOR

Filed May 7, 1964 2 Sheets-Sheet 2

INVENTOR.
ROBERT M. SEE
BY William J. Miller
ATTORNEY

United States Patent Office 3,257,623
Patented June 21, 1966

3,257,623
SINGLE SWEEP AUDIO OSCILLATOR
Robert M. See, Ponca City, Okla., assignor to Continental Oil Company, Ponca City, Okla., a corporation of Oklahoma
Filed May 7, 1964, Ser. No. 365,730
10 Claims. (Cl. 331—40)

This invention relates to a single sweep audio generator wherein a definite range of frequencies is swept a single time and the generator output is then disabled.

The invention is particularly useful in one type of geophysical exploration system. This system employs a a vibrator for vibrating the earth at some chosen point, and receiving geophone indications at some number of points removed from the vibration point. Best operation of the system has been found to be when the vibrator operates for a single sweep through a range of frequencies having a known frequency content and rate of change. The present invention supplies such frequency control.

Audio frequency generators which sweep through a known frequency range have been known in the prior art; however, these prior art devices have employed a continuous sweep for reasons necessitated by their various usages. The existing types of continuous sweep generators for the radio frequency spectrum normally consist of either a motor driven reactive element to sweep the frequency, or a voltage driven reactive element. The conventional method of deriving a continuous audio frequency sweep is by a motor driven capacitor element in an oscillator reactance circuit. In this type of apparatus, wow and flutter become a predominant factor in the linearity of the output sweep frequency.

It is an object of the present invention to provide an apparatus for obtaining a single, linear, sweep frequency in the audio frequency spectrum within predetermined frequency limits.

It is a further object of the invention to enable control of the frequency range as to the rate of change, and duration of change, between the first and last frequency of the swept range.

It is another object to provide an audio frequency generator capable of sweeping through a range of frequencies and then ceasing any further output until the generator is again reset.

Finally, it is an object of this invention to provide a single sweep generator which can be adjustably calibrated to sweep through a chosen range of frequencies at a desired rate of sweep.

These objects are achieved by providing a variable frequency oscillator with means for precisely controlling the range of variation between chosen limits. This variable frequency is then heterodyned with a stable fixed frequency and the desired range of frequencies is selected from among the heterodyne products. Control means are provided, whereby, the rate of change of the frequency and the duration of the change may be controlled; so that, the generator output can be set for a precise range of swept frequencies, which extend over the desired period of time. After delivery of the single sweep of frequencies the generator is disabled and no further output is allowed.

Other objects and advantages of the invention will be evident from the following detailed description when read in conjunction with the accompanying drawings which illustrate the invention.

Figure 1:
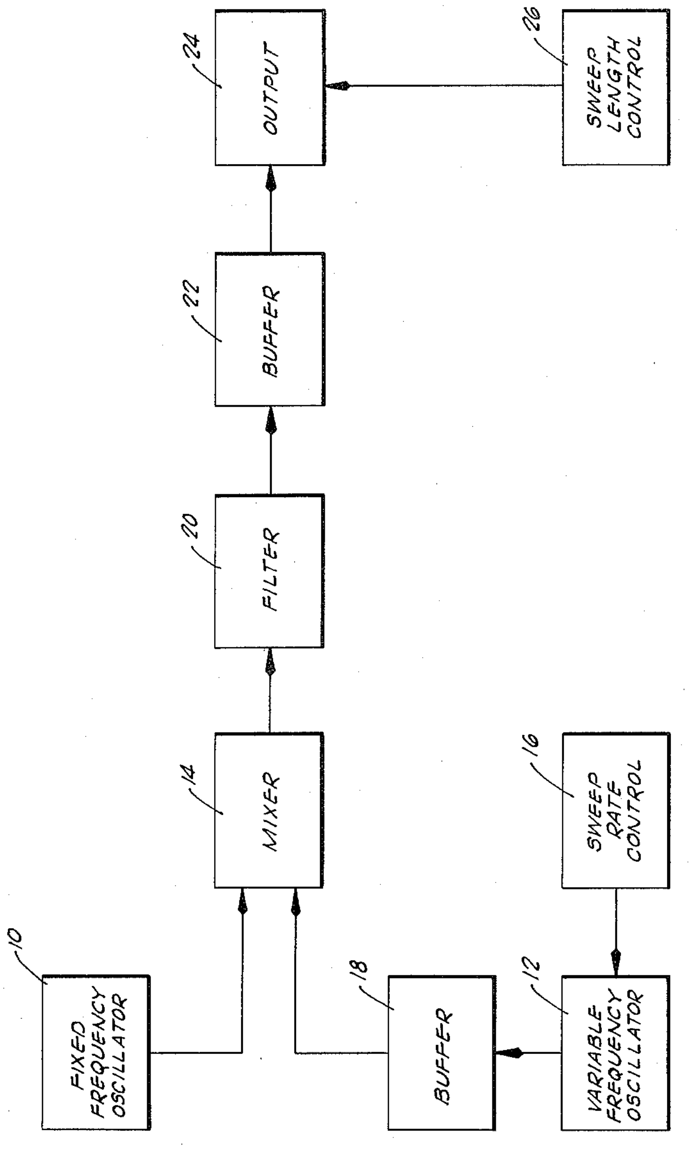
FIG. 1 is a block diagram of the single sweep audio generator.

Dealing first with FIG. 1, there is shown the complete generator in block form. There is a fixed frequency oscillator 10 and a variable oscillator 12, both feeding their output frequencies to the mixer stage 14. The variable oscillator 12 is controlled by the sweep rate circuit 16 to vary its frequency of oscillation. This variable frequency is then supplied through buffer stage 18 to mixer 14, where it is heterodyned with the fixed frequency from oscillator 10. For purposes of description, the fixed frequency has been chosen at 5000 cycles per second while the variable frequency has been set between the limits of 5000 and 4500 cycles per second. These frequencies can be chosen to satisfy any requirements in a wide range of frequencies, depending upon usage of the equipment. In seismic exploration work the 500 cycle variation range has been found to be desirable; and, for ease of effective filtering, the frequency of the variable and fixed oscillators (10 and 12) should be five to ten times the highest desired output frequency.

Mixer 14 heterodynes both the fixed and variable frequencies such that a filter 20, having a low frequency passband, will pass only the difference frequency of the heterodyne frequency content. This difference frequency then, must constitute frequencies from 0 to 500 cycles, depending on the amount of frequency variation imposed on oscillator 12 by the sweep rate control 16.

Buffer stage 22, serving to isolate and prevent any interaction with the frequency selection stages 14 and 20, conducts the desired varying frequency to the output stage 24. Output 24 is controlled as to the time during which it is enabled. That is, the output 24 is closed upon initiation of the frequency sweep of variable frequency oscillator 12 and an output is available; however, after a predetermined time, sweep length control 26 causes the output 24 to open and no further signal can pass. As will be explained, due to the nature of the control circuits, both the sweep rate control 16 and the sweep length control 26 can be adjusted and calibrated to provide a given range of frequency sweep at a desired linear rate of change.

Figure 2:
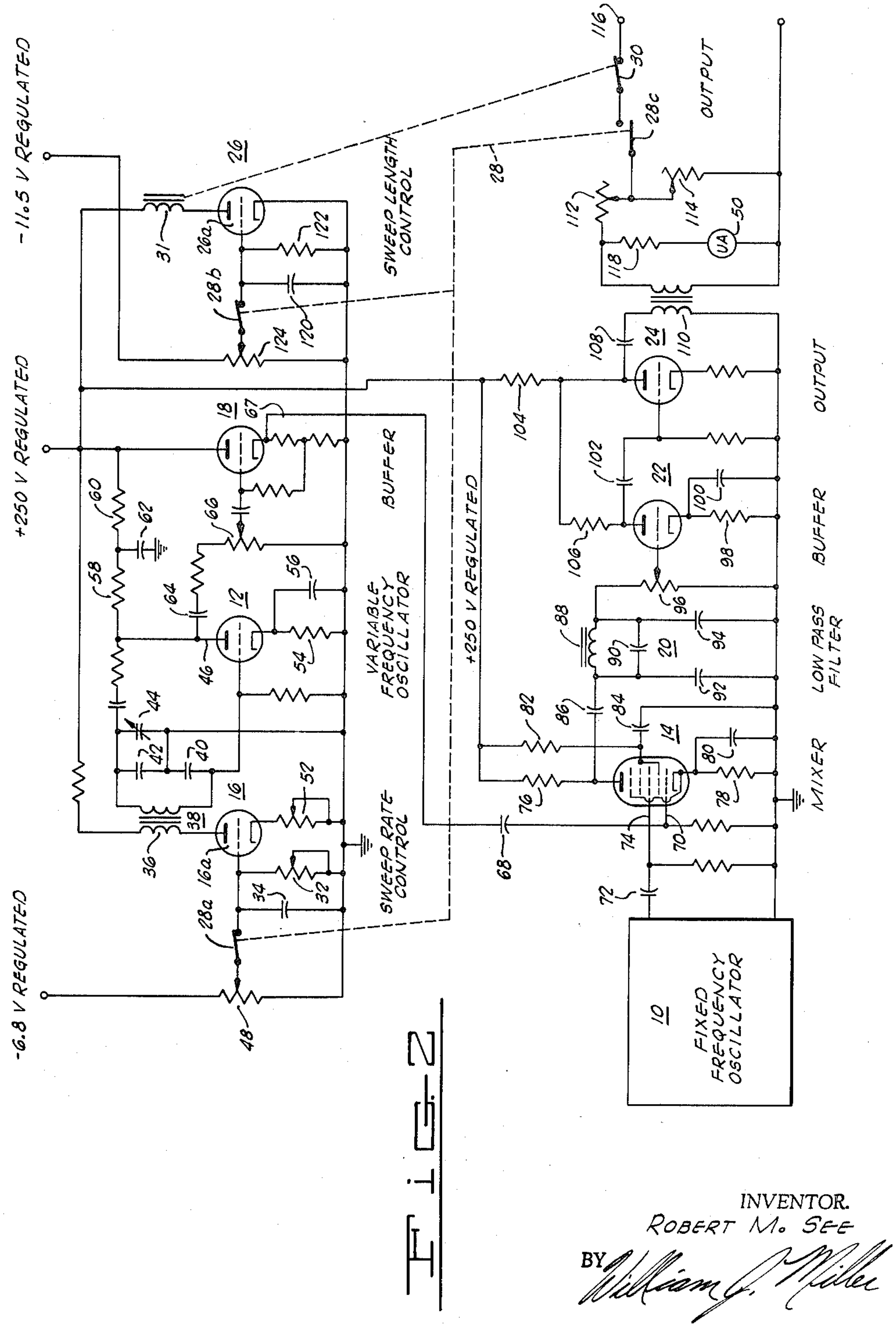
FIG. 2 is a schematic wiring diagram of the generator shown in FIG. 1.

FIG. 2 shows the complete schematic wiring diagram of the single sweep oscillator. The power supply requirements are for a B plus plate supply of 250 volts-regulated to all stages, and a negative bias supply for the control stages. Sweep rate control 16 employs grid bias of minus 6.8 volts-regulated, while the sweep length control 26 requires a cut-off grid bias of minus 11.5 volts-regulated. These are power requirements which are commonly called for and would be available in standard power supply equipments. The derivation of the precise, regulated negative bias voltages would be well within the scope of the skilled artisan.

The switches **28*a* (in sweep rate control 16), 28*b* (in sweep length control 26), and 28*c* and 30 (in output 24) are in the preoperative position; that is, prior to sweeping any frequency, such that no output has yet been enabled. Switches 28*a* and *b* apply a high negative grid bias to hold the sweep rate control 16 and the sweep length control 26 in cut-off condition. Switch 28*c* maintains the output "open," i.e., disallows any output signal, until a sweep is initiated. The switch 30**, closed during this condition, will open at some predetermined later time to terminate the frequency sweep and/or generator output.

To energize the equipment and thus enable an output of variable frequency, switches 28 (*a*, *b* and *c*) are manually thrown to their other positions by an interconnecting mechanical linkage shown in dashed lines. Switch **28*a* removes the negative grid bias from the grid of triode 16*a* which then allows capacitor 34 to discharge through variable resistor 32 to ground. This impresses a gradually rising voltage at the grid of triode 16*a*, causing it to conduct with a linear rise in plate current. The linearly rising current flows through the control winding 36 of the controllable inductor 38**, thereby changing its inductance.

Since the controllable inductor 38 is part of the resonant feedback circuit of the variable frequency oscillator 12, a change in its inductance will cause a proportional change in its output frequency.

The variable oscillator 12 is a Colpitt's-type oscillator, characterized mainly by its low-distortion capabilities, and it provides a stable and easily controllable frequency outputs as required in this application. In the oscillator 12, the controllable inductor 38, in resonance with capacitors 40, 42 and 44, comprises the plate-to-grid feedback circuit. The resonance of this feedback circuit determines the output frequency of the variable oscillator 12. Hence, the linear current rise (from triode 16*a* through control winding 36) changes the inductance of controllable inductor 38; it will also change the resonant frequency of the feedback circuit (38, 40, 42 and 44) and thus, the frequency output at plate 46 of the variable oscillator 12.

The amount of frequency change can be directly related to the current rise through control winding 36 of the inductor 38. A linear rise in current will cause a proportional increase in the inductance and, therefore, a proportional decrease in the output frequency of the oscillator 12. To restate, the inductance 38 is controlled by the linear plate current change of triode 16*a*, which in turn is caused by the capacitor decay voltage of R-C combination 32 and 34. This time constant is such that only a very small linear portion of the decay curve is used to cover the entire generator output frequency range of zero beat to 500 cycles per second.

The variable oscillator 12 is swept from 5000 cycles per second to 4500 cycles per second. The rate of change of the frequency sweep is controlled by potentiometer 32; hence, this provides a frequency range adjustment since a fast or slow rate of change will result in *a*, respectively, lower or higher frequency at the end of the sweep. Adjustment of potentiometer 48 (in the grid biasing circuit of triode 16*a*) and capacitor 44 are used to adjust for the beginning or upper frequency of 5000 cycles per second. These controls are adjusted to show zero beat at an output meter 50; since, the final output frequency must be a beat result of mixing the variable oscillator 12 with the fixed frequency oscillator 10, which has a fixed frequency of 5000 cycles per second. The potentiometer 52 supplies regulation of the cathode bias on control triode 16*a*.

Oscillator 12, a standard Colpitt's configuration, employs the plate-to-grid resonance circuit as aforementioned. The cathode is biased by a resistor 54 with a capacitor 56 supplying A.-C. by-pass. The plate 46 is supplied with B plus voltage through load resistors 58 and 60, and a suitable capacitor 62 provides decoupling to ground. The variable oscillator output is taken from plate 46, through coupling capacitor 64 to a voltage divider 66, where the desired amplitude of signal can be adjusted for application to the grid of the buffer stage 18. Buffer 18 is a conventional cathode follower and provides isolation of the variable frequency oscillator 12. The buffer output is taken from the cathode on line 67 to supply a low impedance signal input through a coupling capacitor 68 to the control grid 70 of mixer stage 14, a heptode converter tube.

Oscillator 10 can be any suitable fixed frequency oscillator capable of generating a low distortion, stable, fixed frequency. In this case, oscillator 10 generates an output of 5000 cycles per second which is applied via a capacitor 72 to the injector or third grid 74 of the mixer 14. The mixer stage heterodynes the fixed frequency of 5000 cycles per second, applied at the injector grid 74, with the sweep frequency varying from 5000 to 4500 cycles per second, which is applied at control grid 70. The heterodyne products appear at the plate of mixer 14, as developed by the load resistor 76. The cathode of mixer 14 is maintained at the proper bias by the cathode resistor 78 and A.-C. variations to the bias are shorted to ground via a capacitor 80. Screen grid bias is supplied to the second and fourth grids through a resistor 82, while a capacitor 84 acts to decouple the screen grid to ground. The fifth grid of the mixer is tied to the cathode and acts to suppress secondary emission in the conventional manner.

The heterodyne products, appearing at the plate of mixer 14, are then coupled by a capacitor 86 to the low pass filter 20. The filter 20, comprised of an inductor 88 and capacitors 90, 92 and 94, is designed to pass only the difference frequency from among the heterodyne products. Since 5000 c.p.s. are heterodyned with some value of 5000 to 4500 c.p.s., the filter 20 will select to conduct some frequency between zero beat and 500 c.p.s. Hence, as the variable frequency is swept from 5000 to 4500 c.p.s., the output from the filter 20 will follow in passing a sweep of frequency from zero beat to 500 c.p.s.

This swept frequency output is conducted through a potentiometer 96 where a suitable amplitude is selected and applied to the grid of the buffer amplifier 22. The buffer 22 is a conventional isolation amplifier, cathode biased by a resistor 98 and the A.-C. bypass capacitor 100. The output from the plate of buffer 22 is taken through a coupling capacitor 102 and applied to the grid of the output amplifier 24. It should be noted here that buffer 22 and amplifier 24 provide a highly stable output combination since they have a common plate-voltage dropping resistor 104. Buffer 22 has an additional resistor 106 in series with the plate supply for developing its output, that which is applied to the output amplifier 24. In effect, the further load resistor 104 serves to develop a difference signal from a portion of the amplified buffer signal and the total signal amplified by triode 24, which serves to cancel all harmonic distortion products from the output. While sacrificing some gain, the amplified output signal will exhibit excellent, distortion-free characteristics.

The output from amplifier 24 is taken from the plate, through a coupling capacitor 108, to the primary of an output transformer 110. The induced signal from transformer 110 is developed across the resistance network, comprising potentiometers 112 and 114, and conducted to the output terminals 116 as controlled by output switches 28*c* and/or 30. The potentiometers 112 and 114 serve as attenuation adjustments; while current limiting resistor 118 and meter 50, connected across the output transformer 110, serve to give a visual indication of the output. As stated before, the meter 50 finds particular use for indicating the zero beat of the fixed and variable oscillators in the initial setting up of the equipment.

Sweep length control 26, having an integral time delay, functions to cease the generator output after a predetermined time. This stage, upon initiation, will conduct through the relay coil 31 to actuate the normally-closed switch 30 in the output circuit as follows. In the equipment "off" or no output condition, switch 28*b* is closed to place a negative bias voltage on the grid of the control triode 26*a* of the sweep length control 26. This also maintains a capacitor 120 (connecting the grid of triode 26*a* to ground) charged up to the potential of the applied grid bias. Upon initiation of an output, when switch 28*b* is thrown to its other position (open); the bias is removed from the grid of triode 26*a* and allowed to rise at a slow, linear rate, in accordance with the discharge of capacitor 120 through the resistor 122 to ground. Triode 26*a* conducts increasingly as controlled by the grid. The R-C time of 120 and 122 is adjusted to provide a slow rise time, on the order of several seconds, so that the gradually increasing plate current through triode 26*a* will not reach a level sufficient to energize the relay coil 31 for some desired period of time. When that current level is attained, the switch 30 is actuated to its open position. This stops any further output until switch 28*b* is again closed to place the negative grid bias on the grid of triode 26*a*, thereby cutting off the tube conduction, and thus de-energizing the relay coil 31. A potentiometer 124 serves to adjust the length of the frequency sweep by adjusting the cut-off bias to the R-C network 120 and 122 in the grid circuit of control triode **26*a***.

Switch 28 is a three section switch, having sections **28*a* and 28*b* closed, and section 28*c* open, when it is in the equipment "no output" condition. The sweep frequency output is initiated by reversing switch 28. Section 28*a* opens; this allows a gradual, linear rise in plate current of triode 16*a* which controls the frequency change of variable oscillator 12 at a linear rate of change. Section 28*b* opens; this allows a linear rise in plate current through triode 26*a* during the swept frequency output interval until the plate current reaches sufficient amplitude to energize relay coil 31 to open the output terminals. Section 28*c* closes; this enables frequency output simultaneously with the beginning of the frequency sweep. As stated above, the other output switch 30 is initially closed and will remain so until opened after the time lapse of the sweep length control triode 26*a***.

The aforedescribed sweep generator automatically sweeps the preset frequency limits and ceases its output at the termination of a preset time. The sweep rate linearity is proportional to the desired sweep width as controlled by an adjustable time-delay reactance means. The frequency stability is dependent on the power supply regulation and length of sweep. The output waveform is excellent, with less than one percent (1%) harmonic distortion, and the amplitude never changes by more than .5 db in the frequency range of 10 to 400 cycles per second.

It is apparent then that this invention constitutes a novel sweep frequency generator, wherein a concise, distortion-free, single sweep of a given frequency range can be obtained. The novel control apparatus enables precise adjustment to the sweep start, rate of change and final frequency in the range; as well as, the necessary coupling and attenuation adjustments which contribute much to its broad utility.

Changes may be made in the combination and arrangement of elements as heretofore set forth in this specification and shown in the appended drawings, it being understood that changes may be made in the embodiment disclosed without departing from the spirit and scope of the invention as defined in the following claims.

I claim:

1. A generator for producing a uniform variation of frequency in a predetermined range comprising:
- means for generating a single linear sweep of a predetermined range of frequencies,
- means for generating a fixed frequency tuned to the highest of said swept frequencies,
- means for mixing the swept frequencies and the fixed frequency, and filtering the output to provide the difference frequency,
- means for initiating the said frequency sweep coincidentally with the enabling of said filtered output, and
- means for disabling the output at a predetermined frequency.

2. A generator as described in claim 1 wherein said means for initiating the frequency sweep comprises a vacuum tube, an R-C circuit connecting the grid of the tube to ground, a control inductance connecting the plate of the tube to said sweep frequency generating means, a negative voltage supply, and a switch connecting the negative voltage supply to the R-C circuit and grid of the tube to remove the negative grid bias and thus increase the plate current flow at a linear rate, said increasing plate current being conducted through the control inductance of said sweep frequency generating means.

3. A generator as described in claim 1 wherein said means for disabling the output comprises a vacuum tube, an R-C circuit connecting the grid of the tube to ground, a relay coil connected in series with the plate of the tube, a negative voltage supply, and a switch connecting the negative voltage supply to the R-C circuit and grid of the tube to remove the negative grid bias and thus increase the plate current flow at a linear rate, said increasing plate current effective at a preset value to cause the relay to operate and thus disable the output.

4. A variable frequency audio generator comprising:
- means for generating a single sweep of variable frequencies lying in a predetermined range,
- means for generating a fixed frequency equal to the highest of said frequencies and at least ten times the highest desired output frequency,
- means for mixing the said variable frequencies and the said fixed frequency,
- filter means connected to the mixer to pass only the difference frequencies to the output, and
- means for disabling the output after a predetermined time interval.

5. A variable frequency audio generator comprising:
- a variable frequency oscillator,
- a fixed frequency oscillator,
- means for mixing the outputs of the two said oscillators,
- means for filtering the mixer output to pass only the difference frequencies to the output,
- switch means for initiating the output,
- control means connected to vary the frequency of the variable frequency oscillator at a predetermined rate upon initiation, and
- control means connected to cease the output a predetermined time after initiation.

6. A variable frequency generator comprising:
- a variable frequency oscillator,
- a fixed frequency oscillator,
- a mixer connected to receive and heterodyne the frequencies from the said oscillators,
- filter means connected to the mixer having a passband concident with said frequency variation range,
- output means to receive the selected variable frequency range, and
- switch means for controlling the output,
- said switch means enabling the variation of said variable frequency oscillator at a predetermined rate of change, said switch means controlling the duration of frequency change, and said switch means enabling an output only during the period of variation of the said variable frequency.

7. A generator for sweeping a predetermined range of frequencies, comprising:
- first oscillator means variable over the predetermined range of frequencies,
- second oscillator means tuned to the highest of said predetermined range of frequencies,
- mixer means for heterodyning the outputs of the two oscillators,
- filter means having a passband coincident with the predetermined range of frequencies and connected to filter the output from the mixer means,
- first control means which upon initiation enables the output of the predetermined range of variable frequencies from said filter means,
- second control means which upon said initiation is effective to control the rate of change of said first oscillator frequency variation at a linear rate,
- third control means which upon said initiation is effective to control the duration of said oscillator frequency variation, and
- switch means connected to simultaneously initiate each of the first, second and third control means.

8. A generator for sweeping a predetermined range of frequencies, comprising:
- first oscillator means variable over a predetermined range of frequencies,
- first control means effective to vary the output frequency of the first oscillator means at a linear rate,
- second oscillator means tuned to the highest of said variable frequencies which is ten times the highest desired output frequency, converter means receiving the signals from the first and second oscillator means and heterodyning the frequencies, filter means selecting the difference frequency from among the heterodyne products, amplifier means for amplifying said difference frequency and passing it to the generator output, second control means effective to disallow the generator output after a predetermined time, and switch means effective to enable the first and second control means simultaneously with allowance of the generator output.

9. A generator as described in claim 8, wherein: said first control means comprises a triode which upon being enabled exhibits a linear rise in plate current, and a control inductance in series with the triode plate which conducts the linearly increasing plate current to thereby vary the frequency of the said first oscillator means.

10. A generator as described in claim 9, wherein: said second control means comprises a triode which upon being enabled exhibits a linear rise in plate current, and a relay coil in series with the triode plate which conducts the linearly increasing plate current and actuates a relay after a preset delay to disallow any further generator output.

No references cited.

ROY LAKE, *Primary Examiner.*

J. KOMINSKI, *Assistant Examiner.*